US010436336B2

(12) United States Patent
Allen

(10) Patent No.: US 10,436,336 B2
(45) Date of Patent: Oct. 8, 2019

(54) CAP WITH VALVE FOR INFLATION

(71) Applicant: Charles Allen, Hurricane, WV (US)

(72) Inventor: Charles Allen, Hurricane, WV (US)

(*) Notice: Subject to any disclaimer, the term of this patent is extended or adjusted under 35 U.S.C. 154(b) by 0 days.

(21) Appl. No.: 16/223,540

(22) Filed: Dec. 18, 2018

(65) Prior Publication Data
US 2019/0145536 A1 May 16, 2019

Related U.S. Application Data

(63) Continuation-in-part of application No. 14/122,000, filed on Nov. 13, 2014.

(51) Int. Cl.
F16K 15/00 (2006.01)
F16K 15/20 (2006.01)
F41J 5/26 (2006.01)
F16K 15/14 (2006.01)
B65D 81/36 (2006.01)
B65D 51/24 (2006.01)
F41J 5/24 (2006.01)
B65B 31/04 (2006.01)
B65D 51/16 (2006.01)

(52) U.S. Cl.
CPC .......... F16K 15/205 (2013.01); B65B 31/047 (2013.01); B65D 51/1672 (2013.01); B65D 51/24 (2013.01); B65D 81/36 (2013.01); F16K 15/144 (2013.01); F16K 15/202 (2013.01); F41J 5/24 (2013.01); F41J 5/26 (2013.01); Y10T 137/0402 (2015.04); Y10T 137/374 (2015.04)

(58) Field of Classification Search
CPC .... B65D 51/002; B65D 51/222; B65D 77/24; A61J 1/2096; A61J 1/1418; A61J 1/2037; F16K 15/205; F16K 15/144; F16K 15/202; F41J 5/26
USPC .......................................... 215/311
See application file for complete search history.

(56) References Cited

U.S. PATENT DOCUMENTS

| 2,713,713 A * | 7/1955 | Tubbs ............................ 29/235 |
| 2,830,610 A * | 4/1958 | Chupa ................... F16K 15/202 137/223 |
| 3,406,872 A * | 10/1968 | Fiquet .................... B65D 47/38 222/499 |
| 3,621,876 A * | 11/1971 | Campbell ............... E04G 21/18 137/846 |
| 3,974,930 A * | 8/1976 | Gizard ................. B65D 51/002 215/247 |
| 4,640,780 A * | 2/1987 | Macierewicz ............ B04C 5/23 209/728 |

(Continued)

Primary Examiner — Ernesto A Grano
(74) Attorney, Agent, or Firm — York Law LLC; Olen L. York, III

(57) ABSTRACT

A cap apparatus includes a cap body and a valve body. The valve body includes an upper portion, a lower portion, and a stem intermediately disposed between the upper portion and the lower portion, the valve body including a bore formed therein having concentric alignment to and traversing the upper portion and the stem, and the valve body including a perforation formed therein having concentric alignment to and traversing the stem and the lower portion. The perforation forms a substantially impermeable seal within the valve body. The cap body includes an aperture in coaxial alignment with the bore and the perforation. The inner surface of the cap body includes multiple internal threads.

20 Claims, 4 Drawing Sheets

(56) References Cited

U.S. PATENT DOCUMENTS

| | | | | |
|---|---|---|---|---|
| 5,348,550 A * | 9/1994 | Ikeda | A61J 1/1462 | 215/364 |
| 5,433,330 A * | 7/1995 | Yatsko | A61J 1/1406 | 215/247 |
| 5,620,434 A * | 4/1997 | Brony | A61J 1/2096 | 141/320 |
| 5,902,298 A * | 5/1999 | Niedospial, Jr. | A61J 1/2089 | 215/247 |
| 5,971,181 A * | 10/1999 | Niedospial, Jr. | A61J 1/2096 | 215/247 |
| 6,056,135 A * | 5/2000 | Widman | A61J 1/18 | 215/247 |
| 6,171,287 B1 * | 1/2001 | Lynn | A61M 39/02 | 251/149 |
| 7,033,339 B1 * | 4/2006 | Lynn | A61M 39/02 | 604/246 |
| 7,252,652 B2 * | 8/2007 | Moorehead | A61M 25/0075 | 604/247 |
| 7,284,580 B2 * | 10/2007 | Dallison | A61J 1/2096 | 141/2 |
| 8,122,922 B2 * | 2/2012 | Baker | B65D 51/002 | 141/27 |
| 8,366,676 B2 * | 2/2013 | Harding | A61M 39/045 | 604/167.04 |
| 8,512,294 B2 * | 8/2013 | Ou-Yang | A61M 39/045 | 604/167.03 |
| 8,820,554 B2 * | 9/2014 | Rho | B65D 51/224 | 215/253 |
| 2002/0193752 A1 * | 12/2002 | Lynn | A61M 39/02 | 604/249 |
| 2004/0217081 A1 * | 11/2004 | Konrad | B65D 51/002 | 215/247 |
| 2005/0159724 A1 * | 7/2005 | Enerson | A61J 1/2096 | 604/411 |
| 2005/0256500 A1 * | 11/2005 | Fujii | A61M 39/045 | 604/523 |
| 2011/0233214 A1 * | 9/2011 | Cheetham | B65D 51/002 | 220/277 |
| 2013/0174937 A1 * | 7/2013 | Wang | B65B 3/003 | 141/2 |
| 2015/0145209 A1 * | 5/2015 | Hoetger | F41J 5/24 | 273/348 |

\* cited by examiner

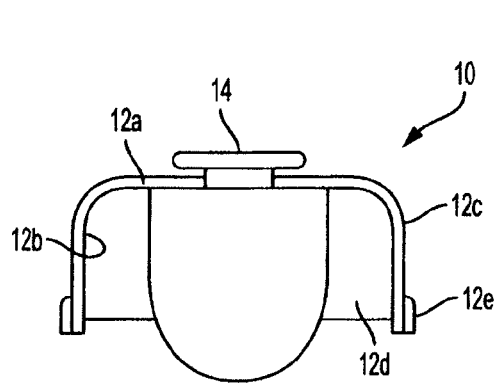
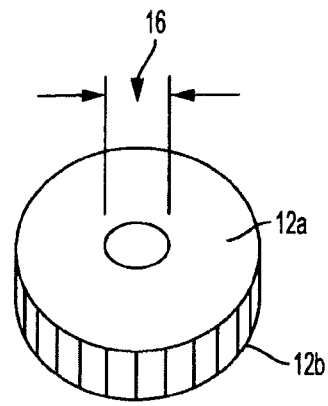
FIG. 2
FIG. 3
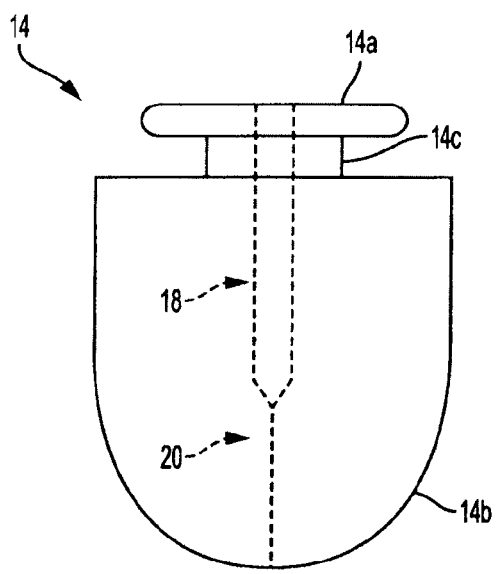
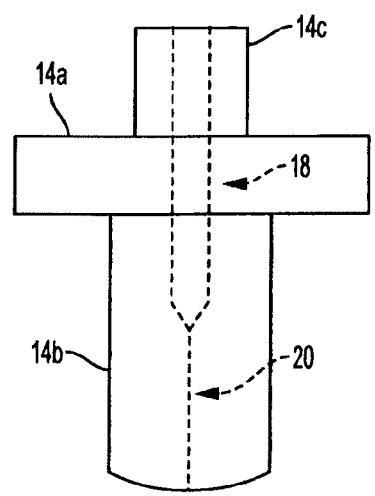
FIG. 4A
FIG. 4B

CAP WITH VALVE FOR INFLATION

I. RELATED APPLICATIONS

This application is a continuation-in-part of U.S. application Ser. No. 14/122,000, filed on Nov. 13, 2014, which claims the benefit of U.S. Provisional Application No. 61/997,173, filed May 23, 2014, the disclosure of which is hereby incorporated by reference in its entirety.

II. FIELD OF THE INVENTION

The present application discloses and describes a cap for a plastic beverage bottle having a valve for inflating the plastic beverage bottle for use in pressurization of the beverage bottle with air for repurposed use of the plastic beverage bottle.

III. BACKGROUND OF THE INVENTION

The National Shooting Sports Foundation ("NSSF") reports that approximately 20.2 million target shooting enthusiasts spend approximately $493 per person, or approximately $9.9 billion per year in total, on all aspects of target shooting, and inject approximately $23 billion into the national economy [http://www.nssf.org/PDF/research/TargetShootinginAmericaReport.pdf]. However, the NSSF also reports that target shooting participation falls off significantly when target ranges are located more than 30-minutes away. This is a particularly acute problem in rural areas where the populations are scattered outside of densely populated areas and away from the economic centers that generally have such target shooting facilities, thereby increasing travel time and costs dedicated to such recreational activities.

To counteract these effects, target shooting equipment is available in sporting goods stores that allow enthusiasts to attempt simulation of the shooting range experience. However, expense to the individual enthusiast becomes a concern, especially considering individuals rarely purchase equipment and materials in-bulk quantities at discounted rates as is often available to commercial shooting range facilities.

One means of addressing expense is through the adoption of "plinking" in which nonstandard targets are utilized as means for simulating or replicating shooting range targets. Usually, the "target" is an object made from metal, wood, glass, plastic, paper, or other similar material, and is often an object that has been previously damaged, reached a state of obsolescence, or is repurposed for an unintended use. However, certain types of "flat" objects fail to fully replicate the sound and experience one achieves on a range.

Accordingly, there is a need for easily-assembled repurposed objects and materials that may be utilized as "plinking" targets to simulate shooting range targets and conditions that is also cost effective and provides additional modes of feedback to enhance the excitement and fun of target shooting that might not otherwise be attained under similar circumstances.

IV. SUMMARY OF THE INVENTION

In accordance with the invention, the problem of repurposing a plastic beverage bottle is solved by a cap having a cap body accommodating a valve body. Once secured to the plastic beverage bottle, an inflation needle is inserted through the valve body and inflates the internal volume of the beverage bottle with air. Once inflated, the beverage bottle may be pierced with a projectile, such as a bullet, arrow, stone, or other similar projectile and causing the beverage bottle to explode and generate a explosive sound.

If desired, certain embodiments may include a cap body formed of thermoplastic material and/or a valve body formed of polymeric elastomer material.

If desired, in certain embodiments, the valve body comprises an upper portion, a lower portion, and a stem intermediately disposed between the upper portion and the lower portion.

If desired, in certain embodiments, the lower portion comprises an inverted umbrella shaped portion circumscribed by a disk-shaped top forming a seal between the inner surface of the cap body and the exterior surface of the disk-shaped top. If desired, in certain embodiments, the disk-shaped top comprises a thickness of at least 1.5 millimeters. In another embodiment, the disk-shaped top comprises a thickness of at least 2.0 millimeters.

In certain embodiments, the valve body includes a bore formed therein having concentric alignment to and traversing the upper portion and the stem, and the valve body including a perforation formed therein having concentric alignment to and traversing the stem and the lower portion. The bore and the perforation are in fluid communication at a mutual junction formed at an internal terminus of the bore and at an internal terminus of the perforation. The bore extends from the mutual junction to an external terminus formed at an exterior surface of the upper portion. The perforation extends from the mutual junction to an external terminus formed at an exterior surface of the lower portion, the perforation forms a substantially impermeable seal within the valve body.

In certain embodiments, the cap body comprising an aperture formed in the center of the cap body. The aperture is disposed in coaxial alignment with the bore and the perforation that is disposed within the valve body. The cap body comprises a disk-shaped wall having a downwardly depending wall circumscribing the exterior margin of wall, and thereby forming an outer surface and an inner surface, the outer surface comprising a plurality of ridges, and the inner surface comprising multiple internal threads.

If desired, certain embodiments of the cap body comprise a first ear having an opening formed along the exterior of the downwardly depending wall of the cap body. It is further envisioned that the cap body comprises a first ear having an opening and a second ear having an opening and each formed along the exterior of the downwardly depending wall of the cap body.

In certain embodiments, the upper portion of the valve body is disposed adjacent the exterior surface of the disk-shaped wall. In another embodiment, the upper portion of the valve body inhibits the downward ejection of the valve body through the aperture. In another embodiment, the upper portion of the valve body forms a seal about the aperture adjacent the exterior surface of the disk-shaped body. In another embodiment, the combination of inhibiting the downward ejection of the valve body and formation of a seal about the aperture adjacent the exterior surface of the disk-shaped body is envisioned.

In certain embodiments, the lower portion of the valve body disposed adjacent to the interior surface of the disk-shaped wall. In another embodiment, the lower portion of the valve body inhibits the upward ejection of the valve body through the aperture. In another embodiment, the lower portion of the valve body forms a seal about the aperture adjacent the interior surface of the disk-shaped body. In another embodiment, the combination of inhibiting the upward ejection of the valve body and formation of a seal about the aperture adjacent the interior surface of the disk-shaped body is envisioned.

In certain other embodiments, the combination of the upper portion of the valve body is disposed adjacent to the exterior surface of the disk-shaped wall and the lower portion of the valve body is disposed adjacent to the interior surface of the disk-shaped wall. In another embodiment, each of the upper portion and the lower portion of the valve body inhibits the ejection of the valve body from the aperture of the cap body. In another embodiment, each of the upper portion and the lower portion of the valve body forms a seal about the aperture adjacent the exterior and interior surfaces of the disk-shaped body.

V. BRIEF DESCRIPTION OF THE DRAWING(S)

The advantages and features of the present invention will become better understood with reference to the following more detailed description and claims taken in conjunction with the accompanying drawings, in which like elements are identified with like symbols, and in which:

FIG. 2 illustrates a cut-away view of one embodiment of the cap depicting the cap body and valve body;

FIG. 3 illustrates one embodiment of the cap body;

FIG. 4a illustrates one embodiment of the valve body;

FIG. 4b illustrates an alternative embodiment of the valve body depicted in FIG. 4a;

VI. DETAILED DESCRIPTION OF THE EMBODIMENT(S)

Figure 1:
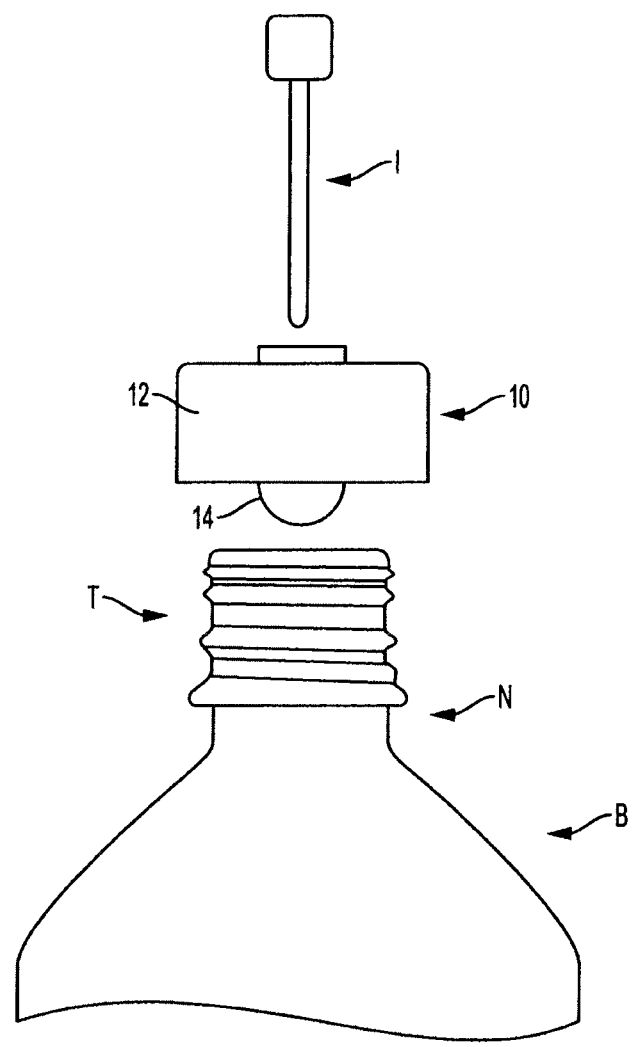
FIG. 1 illustrates an exploded view of one embodiment of a plastic beverage bottle cap device or apparatus used for inflating the beverage bottle.

It will be readily understood that the components of the present invention, as generally described and illustrated in the figures herein, may be arranged and designed in a wide variety of different configurations. Thus, the following detailed description of the embodiments of pet article, as represented in the attached figures, is not intended to limit the scope of the invention as claimed but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a specific feature, structure, or characteristic described in connection with the embodiment may be included in at least one embodiment of the present invention. Thus, appearances of the phrases "example embodiments", "in embodiments", "in other embodiments", or other similar language, throughout this specification do not necessarily all refer to the same group of embodiments, and the described features, structures, or characteristics may be combined in any suitable manner in one or more embodiments.

In accordance with the drawings illustrating at least one embodiment of an inflation valve cap for use on a threaded bottle, as generally depicted in FIG. 1 through FIG. 8, an inflation valve cap 10 is depicted as including a cap body 12 and a valve body 14. The cap body 12 houses the valve body 14. The valve body 14 comprises an upper portion 14a, a lower portion 14b, and intermediately disposed stem portion 14c. The cap body 12 includes an aperture 16 in coaxial alignment with a mutually coaxial bore 18 and perforation 20 disposed within the valve body 14. The cap body 12 includes internal threads for threaded coupling with the threaded neck of a beverage bottle. It is envisioned that all sizes of beverage bottle and cap may be adapted for use in the manner described herein.

The cap body 12 may be constructed from a variety of materials, including many plastics or elastomeric material. It is envisioned that materials presently used in industrial manufacturing of plastic bottle caps will be utilized to take advantage of economies of scale and preexisting technology and techniques. Accordingly, it is envisioned that cap bodies will be manufactured from polyethylene or polypropylene, a thermoplastic material used in the manufacture of plastic containers and bottles. However, other similarly suitable thermoplastic polymers capable of sustaining stretching and blow molding techniques are contemplated as within the scope of the embodiments.

As depicted in FIG. 2 and FIG. 3, the cap body 12 may comprise a wall 12a having a depending wall 12b circumscribing the exterior margin of wall 12a, and thereby forming an outer surface 12c and an inner surface 12d. The wall 12b may be integral and mutually coterminous to wall 12a. The outer surface 12c may comprise a knurled or ridged arrangement providing means for a user to securely grasp and rotate for threading and unthreading the cap body 12 to and from a threaded bottle neck. In one embodiment, the inner surface 12d may comprise multiple internal threads 12f complementary to the external threads provided on the bottle neck. In another embodiment, it is envisioned that the cap body 12 may be secured by force impingement using a variety of known means, and through the pressurization of the bottle, the cap body 12 will securely hold to the bottle neck. A reinforced skirt 12e may circumscribe the free terminus of wall 12b that opposes the co-terminus junction of walls 12a and 12b.

The cap body 12 may comprise an aperture 16 formed through the wall 12a. The aperture 16 may comprise a plurality of dimensions. More specifically, the aperture 16 may be generally arranged in coaxial alignment with the bore 18 and perforation 20 formed in the valve body 14, discussed in greater detail below, although precise coaxial alignment is not required, so long as an inflation needle can traverse the aperture 16 and into the bore 18 and perforation 20. The aperture 16 may be formed during the molding process of the cap body 12 or may be formed post-molding. In one embodiment, the aperture 16 may retain the valve body 14, and specifically, may retain the valve body 14 so that a portion of the valve body 14 resides opposite to and concentrically within the inner surface 12d of the cap body 12.

Figure 5:
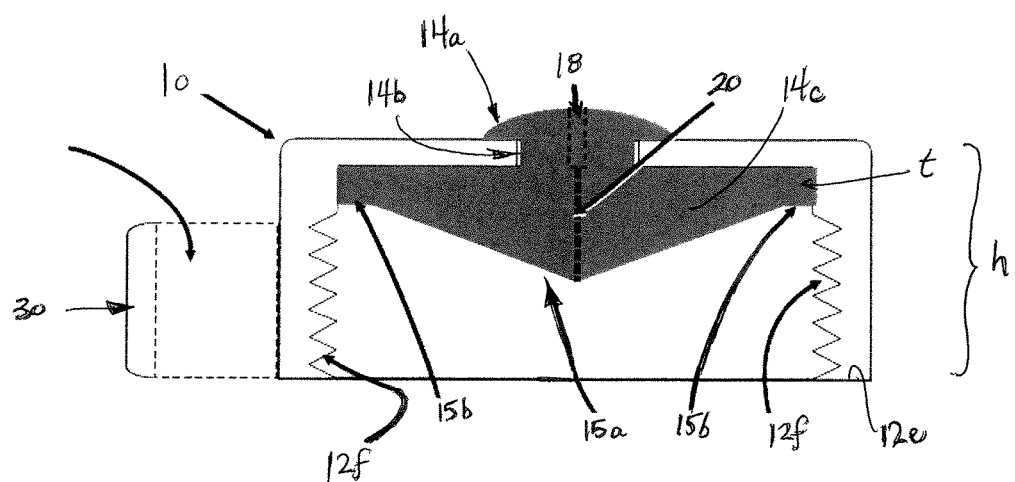
FIG. 5 is a side view of a cap illustrating the cap body, the valve body, and an ear with an opening therethrough in sectional view.
Figure 6:
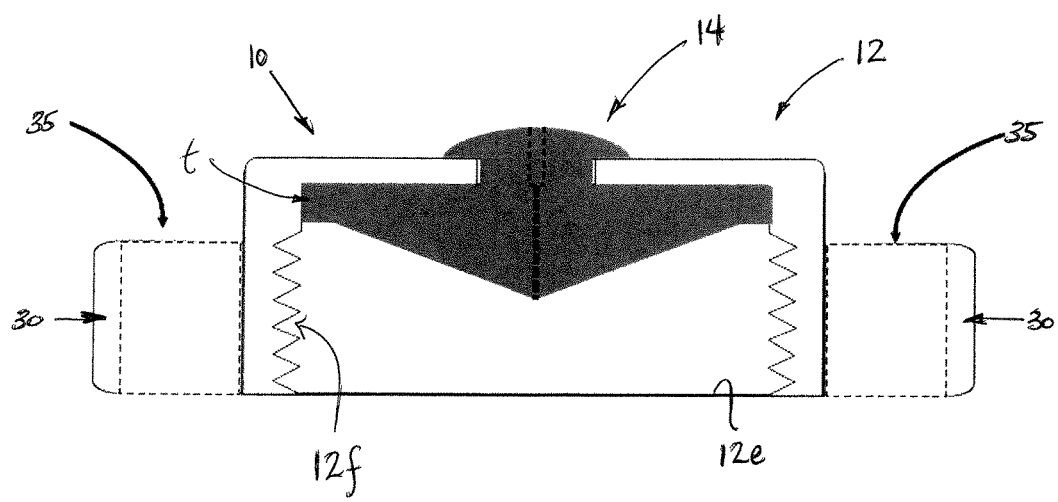
FIG. 6 is a side view of a cap illustrating the cap body, the valve body, and a pair of ears each having an opening therethrough in sectional view.
Figure 7:
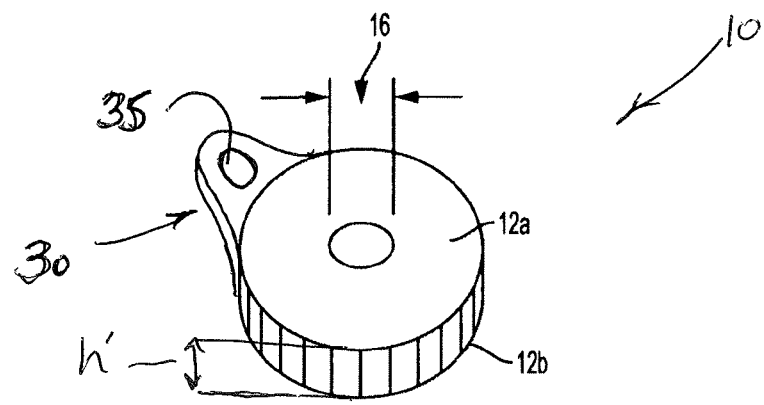
FIG. 7 is a perspective view of a cap having a low-profile body and an ear.

Consistent with FIG. 5 and FIG. 7, the cap body 12 may include a first ear 30 having an opening 35 formed along the exterior of the downwardly depending wall 12b of the cap body 12. Consistent with FIG. 6, it is further envisioned that the cap body 12 comprises a first ear 30 having an opening 35 and a second ear 30 having an opening 35 and each formed along the exterior of the downwardly depending wall 12b of the cap body 12. It is further envisioned that the two-ear arrangement in FIG. 6 may be additionally and optionally utilized for facilitating threaded placement and/or removal of the cap 10 from a beverage bottle (B). Consistent with such an embodiment, a user can variously grasp or use as leverage both ears 30 for counterclockwise and/or clockwise threaded rotation of the cap 10 for engaging or disengaging the external threads of the neck of the beverage bottle (B). It is envisioned that several techniques might be used, including placement of the thumb and a finger (such as the index finger) to apply force to one side of the ear(s) 30 to urge the ear(s) 30 in the same rotational direction for threading or unthreading of the cap 10.

Figure 8:
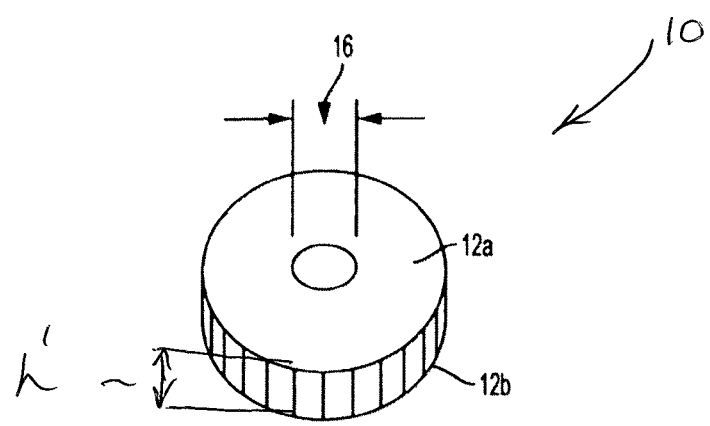
FIG. 8 is a perspective view of a cap having a low-profile body.

As depicted in FIG. 5 and FIG. 6, the cap body 12 may have a height (h) accommodating internal threads sufficient to provide at least two full rotations of the cap 10 about the neck of a beverage bottle (B). This height (h) is suitable for use with standard beverage bottles, esp. for those with denser material and/or construction, such as those of the major soda manufacturers and/or distributors as well as water bottle providers such as AQUAFINA™ and DASANI™. As depicted in FIG. 7 and FIG. 8, the height (h') is of a lower profile and accommodates internal threads sufficient to provide fewer than two full rotations of the cap 10 about the neck of a beverage bottle (B). The height (h') is suitable for use with bottles of less dense material and/or construction, such as those provided by NESTLE™ and many of the grocer store brands provided throughout commerce.

As depicted in FIG. 4a, the valve body 14 may be constructed from a variety of materials, including natural or synthetic rubbers (e.g., polymeric elastomers), so long as the material(s) is/are resilient, flexible, and durable. It is envisioned that one embodiment of the valve body 14 comprises a toroidal or annular flange 14a, a bulbous portion 14b, and an intermediately disposed stem 14c. The bore 18 is concentric to the flange 14a, bulbous 14b, and stem 14c portions, and therefore generally concentric to the valve body 14. The bore 18 penetrates or traverses the flange 14a portion and the stem 14c portion, and partially penetrates or traverses the bulbous portion 14b. A perforation 20 begins at the terminus of the bore 18 and continues to the exterior margin of the bulbous portion 14b. The perforation 20 forms a substantially impermeable seal within the valve body 14 so that no appreciable quantity of air, liquid, or other media or material ingresses or egresses the perforation 20. The bore 18 is adapted to receive and retain an inflation needle from a hand pump, pneumatic pump, compressor, or other similar inflation device. The perforation 20 is adapted to displace when the inflation needed is inserted therethrough, and to retain the inflation needle during the inflation process. After the inflation needle is removed from the perforation 20, the material urges return of the perforation to an initial state of being a substantially impermeable barrier, and thereby preventing media ingress or egress across the perforation 20.

In another embodiment, as depicted in FIG. 4b, the valve body 14 comprises a toroidal flange 14a intermediately disposed between a bulbous portion 14b and a stem 14c. The bore 18 is concentric to the bulbous 14b, flange 14a, and stem 14c portions, and therefore generally concentric to the valve body 14 as a whole. The bore 18 penetrates or traverses the flange 14a portion and the stem 14c portion, and partially penetrates or traverses the bulbous portion 14b. A perforation 20 begins at the terminus of the bore 18 and continues to the exterior margin of the bulbous portion 14b.

Consistent with FIG. 5 and FIG. 6, the lower portion 14b comprises an inverted umbrella shaped portion 15a circumscribed by a disk-shaped top 15b forming a seal between the inner surface of the cap body 12 and the exterior surface of the disk-shaped top 15b. If desired, in certain embodiments, the disk-shaped top 15b comprises a thickness (t) of at least 1.5 millimeters. In another embodiment, the disk-shaped top 15b comprises a thickness (t) of at least 2.0 millimeters. There is particular advantage to having a thicker disk-shaped top 15b in that many beverage bottles (B) have a safety band that remains on the neck once the original cap is removed. It was discovered that the safety band often creates a seating problem for the cap 10 described herein, especially for the lower profile necks (such as that of NESTLE™). A thicker disk-shaped top 15b provides better seating and better sealing for the cap 10 and prevent unwanted egress of fluid (esp. air) that has been inserted into the bottle for use with the cap 10.

It is envisioned that the valve body 14 may be integral to the cap body 12 so that a portion of the valve body 14 resides on one side of aperture 16 and another portion of valve body 14 resides on the opposing side of aperture 16. In this arrangement, the valve body 14 may be formed concurrent with or sequentially to the formation of the aperture 16 in cap body 12. In another embodiment, it is envisioned that valve body 14 and cap body 12 are separate components that may be coupled through compression or impingement of the valve body 14 by the cap body 12 (using the threaded coupling of the cap body 12 to the threaded neck of the beverage bottle).

It is envisioned that the inflation valve cap may be sold as a part of a kit. In one embodiment, the kit includes packaging and a plurality of inflation valve caps 10 contained in the packaging. In another embodiment, the kit includes packaging, a plurality of inflation valve caps 10, and instructions for use. In another embodiment, the kit includes packaging, instructions for use, and a plurality of inflation valve caps 10 comprising an integral cap body 12 and valve body 14. In another embodiment, the kit includes packaging, instructions for use, and plurality of inflation valve caps 10 comprising a cap body 12 separate from the valve body 14. In another embodiment, the kit includes packaging, instructions for use, and a plurality of inflation valve caps comprising at least one integral cap body 12 and valve body 14 and at least one separate cap body 12 and one separate valve body 14.

In use, the inflation valve cap 10 may be installed on a plastic beverage bottle (B). Ensuring that the valve body 14 will at least partially reside in the throat (T) of the beverage bottle (B) neck (N), the cap body 12 may be threaded onto the neck (N) of the bottle (B). An inflation needle (I) may be inserted through the aperture 16 (of cap body 12) and through bore 18 and perforation (of valve body 14) so that the terminus of the inflation needle (I) is in fluid communication with the interior volume of the beverage bottle (B). Thereafter, a pump may be used to direct air from the pump, through the needle, and into the interior volume of beverage bottle (B). Once the beverage bottle (B) is sufficiently filled with air, the inflation needle (I) may be removed, thereby sealing the air and any other media within the beverage bottle (B). The beverage bottle (B) may be positioned or staged as desired for target shooting. A weapon may be used to propel a projectile at the beverage bottle (B) target with the intention of rupturing the beverage bottle (B). It is envisioned that a weapon may comprise a variety of articles, including traditional firearms, compressed air or CO-powered BB or pellet guns, crossbows, longbows, sling-shots, or other similar articles.

It is envisioned that another useful step includes the addition of water, with or without coloring, to approximately ¼ to ⅓ of the total volume of the beverage bottle (B). Providing a water-based medium allows the user to invert the beverage bottle (B) from its typical orientation, including placement in a base suitable for holding the neck (N) of the beverage bottle (B). In addition, it is believed that the addition of a water-based medium for inverted-staging of the beverage bottle (B) insulates the inflation valve cap 10 from damage and extends the useful life of the cap 10 for additional uses. It is further envisioned that other suitable fluid material may be used to infill the internal volume of the beverage bottle.

It is further envisioned that a powder-media may be used to fill the interior volume of the beverage bottle (B) to safely replicate the shooting range experience. For example, at some shooting ranges, tannerite is used to generate flash explosions and smoke to indicate to a shooter that s/he has hit the target. Tannerite comprises two inert materials that when combined are poised to explode and smoke upon contact by a bullet or round of ammunition. To avoid using potentially explosive materials, and since flat objects do not receive and retain powder easily, the use of powder (e.g., talc) within the interior volume of a beverage bottle (B) provides a safe and fun alternative as a means for indicating the target has been successful struck during target practice.

Although the inflation valve cap 10 has been generally described for recreational use apart from a traditional target shooting range, it is envisioned that a commercial shooting range may use and incorporate such devices, apparatuses, methods, and concepts as well, therefore, all the descriptions and examples should be understood as broadly applying to uses at commercial shooting ranges and off-site on the personal property of target shooting enthusiasts and the like, and unless otherwise stated, no limitation should be interpreted or implied.

For example, a commercial shooting range or a property owner could collect and repurpose commercially sold plastic beverage bottles (B) for targets as generally described above. The ubiquity of 2-liter, 1-liter, 24-, 16-, and 8-ounce bottles, and other such containers, allow the range or owner to mix and match a plurality of variously sized beverage bottles (B) for competition-style course arrangements, since the large bottles will be easier to see and strike and the smaller bottles more challenging. Avoiding redundancy in the type of target utilized for practice is often a key aspect in maintaining the interest of novice target shooters. After the beverage bottles (B) have been struck, the plastic fragments may be collected and shipped to a recycling center, thereby providing the added advantage of recycling such bottles or containers and advancing the recycling step by initially breaking down the bottles into smaller fragments.

It is to be understood that the embodiments and claims are not limited in its application to the details of construction and arrangement of the components set forth in the description and illustrated in the drawings. Rather, the description and the drawings provide examples of the embodiments envisioned, but the claims are limited to the specific embodiments. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. A plastic beverage bottle cap apparatus comprising:
a cap body and a valve body, the cap body comprising thermoplastic material, the valve body comprising a polymeric elastomer material;
the valve body comprising an upper portion, a lower portion, and a stem intermediately disposed between the upper portion and the lower portion, the valve body including a bore formed therein having concentric alignment to and traversing the upper portion and the stem, and the valve body including a perforation formed therein having concentric alignment to and traversing the stem and the lower portion, the bore and the perforation in fluid communication at a mutual junction formed at an internal terminus of the bore and at an internal terminus of the perforation, wherein the bore extends from the mutual junction to an external terminus formed at an exterior surface of the upper portion and the perforation extends from the mutual junction to an external terminus formed at an exterior surface of the lower portion, the perforation forms a substantially impermeable seal within the valve body;
the cap body comprising an aperture formed in the center of the cap body, the aperture in coaxial alignment with the bore and the perforation disposed within the valve body, the cap body comprising a disk-shaped wall having a downwardly depending wall circumscribing the exterior margin of wall, and thereby forming an outer surface and an inner surface, the outer surface comprising a plurality of ridges, and the inner surface comprising multiple internal threads that are configured to mate with the external threads of a beverage bottle.

2. The apparatus of claim 1, the cap body further comprising a reinforced skirt circumscribing the free terminus of the downwardly depending wall.

3. The apparatus of claim 1, the upper portion of the valve body disposed adjacent the exterior surface of the disk-shaped wall inhibiting downward ejection of the valve body through the aperture.

4. The apparatus of claim 1, the upper portion of valve body disposed adjacent the exterior surface of the disk-shaped wall forming a seal about the aperture.

5. The apparatus of claim 1, the lower portion of valve body disposed adjacent to the interior surface of the disk-shaped wall inhibiting upward ejection of the valve body through the aperture.

6. The apparatus of claim 1, the lower portion of valve body disposed adjacent to the interior surface of the disk-shaped wall forming a seal about the aperture.

7. The apparatus of claim 1, wherein:
the upper portion of the valve body disposed adjacent the exterior surface of the disk-shaped wall inhibiting downward ejection of the valve body through the aperture; and
the lower portion of the valve body disposed adjacent to the interior surface of the disk-shaped wall inhibiting upward ejection of the valve body through the aperture.

8. The apparatus of claim 1, the upper portion of the valve body forming a seal about the aperture adjacent the exterior surface of the disk-shaped body and the lower portion of the valve body forming a seal about the aperture adjacent the interior surface of the disk-shaped body.

9. The apparatus of claim 1, wherein the downwardly depending wall comprises a length accommodating internal threads sufficient for at least two complete turns of the cap apparatus mated with the external threads of a beverage bottle.

10. The apparatus of claim 1, wherein the downwardly depending wall comprises a length accommodating internal threads sufficient for less than two complete turns of the cap apparatus mated with the external threads of a beverage bottle.

11. The apparatus of claim 1 further comprising an ear having an opening formed along the exterior of the downwardly depending wall of the cap body.

12. The apparatus of claim 1 further comprising a first ear and a second ear, each ear having an opening formed along the exterior of the downwardly depending wall of the cap body.

13. A plastic beverage bottle cap apparatus comprising:
a cap body and a valve body, the cap body comprising thermoplastic material, the valve body comprising a polymeric elastomer material;
the valve body comprising an upper portion, a lower portion, and a stem intermediately disposed between the upper portion and the lower portion, the lower portion comprising an inverted umbrella shaped portion circumscribed by a disk-shaped top forming a seal between the inner surface of the cap body and the exterior surface of the disk-shaped top;
the valve body including a bore formed therein having concentric alignment to and traversing the upper portion and the stem, and the valve body including a perforation formed therein having concentric alignment to and traversing the stem and the lower portion, the bore and the perforation in fluid communication at a mutual junction formed at an internal terminus of the bore and at an internal terminus of the perforation, wherein the bore extends from the mutual junction to an external terminus formed at an exterior surface of the upper portion and the perforation extends from the mutual junction to an external terminus formed at an exterior surface of the lower portion, the perforation forms a substantially impermeable seal within the valve body;
the cap body comprising an aperture formed in the center of the cap body, the aperture in coaxial alignment with the bore and the perforation disposed within the valve body, the cap body comprising a disk-shaped wall having a downwardly depending wall circumscribing the exterior margin of wall, and thereby forming an outer surface and an inner surface, the outer surface comprising a plurality of ridges, the inner surface comprising multiple internal threads that are configured to mate with the external threads of a beverage bottle, and a first ear having an opening formed along the exterior of the downwardly depending wall of the cap body.

14. The apparatus of claim 13, the upper portion of the valve body disposed adjacent the exterior surface of the disk-shaped wall inhibiting downward ejection of the valve body through the aperture.

15. The apparatus of claim 13, the upper portion of valve body disposed adjacent the exterior surface of the disk-shaped wall forming a seal about the aperture.

16. The apparatus of claim 13, the lower portion of valve body disposed adjacent to the interior surface of the disk-shaped wall inhibiting upward ejection of the valve body through the aperture.

17. The apparatus of claim 13, the lower portion of valve body disposed adjacent to the interior surface of the disk-shaped wall forming a seal about the aperture.

18. The apparatus of claim 13, wherein:
the upper portion of the valve body disposed adjacent the exterior surface of the disk-shaped wall inhibiting downward ejection of the valve body through the aperture and forming a seal about the aperture adjacent the exterior surface of the disk-shaped body; and
the lower portion of the valve body disposed adjacent to the interior surface of the disk-shaped wall inhibiting upward ejection of the valve body through the aperture and forming a seal about the aperture adjacent the interior surface of the disk-shaped body.

19. The apparatus of claim 13, the disk-shaped top forming a seal between the inner surface of the cap body and the exterior surface of the disk-shaped top comprises a thickness of at least 1.5 millimeters.

20. The apparatus of claim 13, the disk-shaped top forming a seal between the inner surface of the cap body and the exterior surface of the disk-shaped top comprises a thickness of at least 2.0 millimeters.

* * * * *